(12) United States Patent
Kindler et al.

(10) Patent No.: US 7,951,349 B2
(45) Date of Patent: May 31, 2011

(54) METHOD AND SYSTEM FOR STORING AND GENERATING HYDROGEN

(75) Inventors: Andrew Kindler, San Marino, CA (US); Sri R. Narayanan, Arcadia, CA (US); Yuhong Huang, West Hills, CA (US)

(73) Assignee: The California Institute of Technology, Pasadena, CA (US)

( * ) Notice: Subject to any disclaimer, the term of this patent is extended or adjusted under 35 U.S.C. 154(b) by 687 days.

(21) Appl. No.: 11/800,737

(22) Filed: May 7, 2007

(65) Prior Publication Data

US 2008/0075987 A1 Mar. 27, 2008

Related U.S. Application Data

(60) Provisional application No. 60/798,545, filed on May 8, 2006.

(51) Int. Cl.
C01B 3/06 (2006.01)
C01B 3/08 (2006.01)
C01B 3/10 (2006.01)
H01M 8/06 (2006.01)

(52) U.S. Cl. .................. 423/416; 423/657; 429/417

(58) Field of Classification Search .............. 423/657, 423/658; 429/416, 417
See application file for complete search history.

(56) References Cited

U.S. PATENT DOCUMENTS

| | | | |
|---|---|---|---|
| 3,932,600 A | 1/1976 | Guthier et al. | |
| 3,940,474 A | 2/1976 | Huskins et al. | |
| 3,957,483 A | 5/1976 | Suzuki | |
| 3,977,990 A | 8/1976 | Beckert et al. | |
| 4,064,226 A | 12/1977 | Becker et al. | |
| 4,072,514 A | 2/1978 | Suzuki | |
| 4,231,891 A | 11/1980 | Beckert et al. | |
| 4,309,403 A | 1/1982 | Robinson et al. | |
| 4,314,984 A | 2/1982 | Frosch et al. | |
| 4,341,651 A | 7/1982 | Beckert et al. | |
| 5,143,047 A | 9/1992 | Lee | |
| 5,372,617 A | 12/1994 | Kerrebrock et al. | |
| 5,702,491 A * | 12/1997 | Long et al. ................ | 48/197 R |
| 5,882,623 A * | 3/1999 | Zaluska et al. ............ | 423/648.1 |
| 6,358,488 B1 | 3/2002 | Suda | |
| 6,440,385 B1 | 8/2002 | Chaklader | |
| 6,534,033 B1 | 3/2003 | Amendola et al. | |
| 6,572,836 B1 * | 6/2003 | Schulz et al. ............. | 423/648.1 |
| 6,582,676 B2 | 6/2003 | Chaklader | |
| 6,683,025 B2 | 1/2004 | Amendola et al. | |
| 6,745,801 B1 | 6/2004 | Cohen et al. | |
| 6,834,623 B2 | 12/2004 | Cheng | |
| 6,886,609 B2 | 5/2005 | Cohen et al. | |

(Continued)

FOREIGN PATENT DOCUMENTS

RU 2241656 12/2004

(Continued)

*Primary Examiner* — Wayne Langel
(74) *Attorney, Agent, or Firm* — Joseph W Mott

(57) ABSTRACT

A method and system for storing and generating hydrogen. The method comprises generating hydrogen and heat from the reaction of a metal or metal compound with water. The heat generated from this reaction may then be converted to other forms of energy such as by passing the heat through a thermal electric device to recover electrical energy for storage in a battery. In an alternative and preferred embodiment, the heat is used to drive additional reactions for generating more hydrogen and is preferably used to drive an endothermic dehydrogenation reaction resulting in increased hydrogen generation and consumption of the heat.

24 Claims, 5 Drawing Sheets

U.S. PATENT DOCUMENTS

| | | |
|---|---|---|
| 6,899,862 B2 | 5/2005 | Baldwin et al. |
| 7,001,681 B2 * | 2/2006 | Wood .................. 429/421 |
| 7,029,517 B2 * | 4/2006 | Lemmon et al. |
| 7,052,671 B2 * | 5/2006 | McClaine et al. |
| 7,105,033 B2 * | 9/2006 | Strizki et al. |
| 7,179,443 B2 * | 2/2007 | Schell et al. .................. 423/657 |
| 2002/0048548 A1 | 4/2002 | Chaklader |
| 2002/0081235 A1 | 6/2002 | Baldwin et al. |
| 2002/0083643 A1 | 7/2002 | Amendola et al. |
| 2002/0166286 A1 | 11/2002 | McClaine et al. |
| 2003/0157018 A1 | 8/2003 | Zaluski et al. |
| 2003/0228252 A1 * | 12/2003 | Shurtleff .................. 423/657 |
| 2004/0025808 A1 | 2/2004 | Cheng |
| 2004/0033194 A1 | 2/2004 | Amendola et al. |
| 2004/0148857 A1 | 8/2004 | Strizki et al. |
| 2004/0187950 A1 | 9/2004 | Cohen et al. |
| 2005/0175868 A1 | 8/2005 | McClaine et al. |
| 2005/0191236 A1 | 9/2005 | Pinkerton et al. |
| 2005/0281735 A1 | 12/2005 | Chellappa et al. |
| 2006/0042162 A1 | 3/2006 | Goldstein et al. |
| 2006/0133948 A1 * | 6/2006 | Siegel |
| 2006/0225349 A1 * | 10/2006 | Krause et al. |
| 2006/0236606 A1 * | 10/2006 | Strizki et al. |
| 2006/0292066 A1 * | 12/2006 | Pez et al. |
| 2007/0020175 A1 * | 1/2007 | Graham et al. |
| 2007/0062115 A1 * | 3/2007 | Berry et al. |
| 2007/0068071 A1 * | 3/2007 | Kelly et al. |
| 2008/0152584 A1 * | 6/2008 | Anand .................. 423/657 |

FOREIGN PATENT DOCUMENTS

| | | | |
|---|---|---|---|
| WO | WO 98/30493 | * | 7/1998 |
| WO | WO 01/51410 A1 | * | 7/2001 |
| WO | WO 01/85606 A1 | * | 11/2001 |
| WO | WO 02/06153 A1 | * | 1/2002 |
| WO | WO 02/14213 A2 | * | 2/2002 |
| WO | WO 02/057006 A1 | * | 7/2002 |
| WO | WO 02/066369 A1 | * | 8/2002 |
| WO | WO 02/086987 A2 | * | 10/2002 |
| WO | WO 03/006366 A1 | * | 1/2003 |
| WO | WO 03/041188 A2 | * | 5/2003 |
| WO | WO 03/051768 A1 | * | 6/2003 |
| WO | WO 03/055796 A1 | * | 7/2003 |
| WO | WO 03/078540 A2 | * | 9/2003 |
| WO | WO 2004/018352 A1 | * | 3/2004 |
| WO | WO 2004/052670 A2 | * | 6/2004 |
| WO | WO 2004/071946 A2 | * | 8/2004 |
| WO | WO 2005/037421 A2 | * | 4/2005 |
| WO | WO 2005/041325 A2 | * | 5/2005 |
| WO | WO 2005/091766 A2 | * | 10/2005 |
| WO | WO 2005/102914 A2 | * | 11/2005 |
| WO | WO 2005/118126 A1 | | 12/2005 |
| WO | WO 2006/081402 A2 | | 8/2006 |
| WO | WO 2006/104787 A2 | | 10/2006 |
| WO | WO 2007/002357 A2 | | 1/2007 |
| WO | WO 2007/016779 A1 | | 2/2007 |
| WO | WO 2007/035512 A2 | | 3/2007 |
| WO | WO 2007/035845 A2 | | 3/2007 |

* cited by examiner

METHOD AND SYSTEM FOR STORING AND GENERATING HYDROGEN

CROSS-REFERENCE TO RELATED APPLICATIONS

This application is based on and claims priority to U.S. Provisional Application Ser. 60/798,545 filed on May 8, 2006, which is hereby incorporated herein by reference.

STATEMENT REGARDING FEDERALLY SPONSORED RESEARCH OR DEVELOPMENT

This invention was made by an agency of the United States government, contract number NAS7-1407 awarded by the NASA.

BACKGROUND OF THE INVENTION

1. Field of the Invention

The present invention is directed to the field of alternative fuels, and is more particularly directed to a method and system for storing and generating hydrogen. The method and system may be utilized to store a stable hydrogen source in a safe manner and to generate hydrogen gas therefrom upon demand for use as a fuel. In a preferred embodiment, the system and method are utilized on-board a vehicle to provide hydrogen as a primary or supplemental fuel source.

2. Description of Related Art

Hydrogen is a promising source of fuel for powering vehicles in conjunction with polymer electrolyte membrane (PEM) fuel cells and/or modified hydrogen internal combustion engines (ICE). Considerable efforts have been made to develop suitable storage technologies for storing the hydrogen fuel source onboard. A variety of factors must be considered in developing an acceptable hydrogen storage system for use onboard a vehicle. First and foremost is safety. It is important to develop a system for storing the hydrogen in a relatively stable and protected manner so as reduce safety concerns in the event of a collision.

Another consideration is overall economic viability and efficiency. A viable solution needs to provide a relatively lightweight system taking up little space or volume, yet providing significant fuel to enable the vehicle to operate for extended periods of time before re-fueling. In addition, it is important that the power needed onboard to generate the hydrogen be significantly less than the power produced by the fuel cell or engine for operating the vehicle. The cost of the system including the cost of any raw materials used to store and generate the hydrogen, as well as the cost of recycling or disposing of any waste products, must also be considered in assessing the overall economic viability of the system.

In addition, the environmental impact of the system is of critical importance. There is a desire to develop a system that minimizes pollution in terms of emissions and waste products generated in the production of raw materials and through operation of the vehicle. In this regard, there is a desire to minimize the use of fossil fuels in conjunction with the system to reduce carbon monoxide emissions and to reduce dependency on fossil fuel sources.

Lastly, the system must present an alternative for drivers that are relatively convenient for use, including providing a relatively convenient means for refueling or recharging the system and for disposing of any waste products.

The Department of Energy ("DOE") has established goals for the development of hydrogen fuel systems to be used onboard vehicles. These goals address many of the considerations stated above including the amount of weight and volume utilized by the system in relation to the amount of energy supplied, as well as the cost of the fuel. A variety of different technologies is currently in various stages of development in an effort to meet these goals. While many of these technologies have promise, a need remains in the art for an innovative system that is relatively safe, efficient, cost effective, convenient, and environmentally friendly.

BRIEF SUMMARY OF THE INVENTION

The present invention is directed to a method and system for storing a hydrogen source in a relatively stable and safe form, and for generating hydrogen gas therefrom upon demand for use as a fuel. The method and system are particularly well adapted as a primary or supplemental fuel source onboard vehicles such as automobiles or buses for use in conjunction with a hydrogen fuel cell, modified hydrogen internal combustion engine or other hydrogen fuel based power system.

The method comprises generating hydrogen and energy in the form of heat from an oxidation reaction, preferably the reaction of a metal or metal compound with water. The heat generated from this reaction may then be converted to other forms of energy such as by passing the heat through a thermal electric device to recover electrical energy for storage in a battery. In a preferred embodiment, the heat is used to drive additional reactions for generating more hydrogen and is most preferably used to drive an endothermic dehydrogenation reaction resulting in increased hydrogen generation and consumption of the heat.

In one embodiment of the invention, a metal or metal compound such as a metal hydride is reacted with high temperature steam in a reaction chamber to yield hydrogen gas ($H_2$) and a metal oxide:

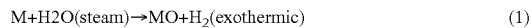

$$M + H2O(steam) \rightarrow MO + H_2 (exothermic) \qquad (1)$$

Exemplary reactions include the use of magnesium or magnesium hydride:

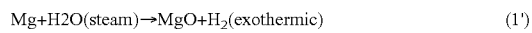

$$Mg + H2O(steam) \rightarrow MgO + H_2 (exothermic) \qquad (1')$$

or

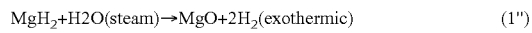

$$MgH_2 + H2O(steam) \rightarrow MgO + 2H_2 (exothermic) \qquad (1'')$$

This oxidation reaction is exothermic in nature generating a significant amount of excess heat. The hydrogen gas may then be passed through a cooler and supplied to a fuel cell or hydrogen internal combustion engine (ICE). In this manner, the hydrogen is stored onboard in relatively stable and safe form (e.g. in the form of water and/or a metal hydride). Hydrogen gas is generated only upon demand for consumption within the hydrogen fuel based power system.

The amount of steam reacted with the metal compound is proportional to the amount of hydrogen gas generated, such that the amount of hydrogen gas generated on demand can be controlled via the amount of steam injected into the reaction chamber at any given time. The oxidized by-product can be collected and removed from the reaction chamber at a later time and recycled using various means known in the art. For example, in relation to the by-product magnesium oxide, this by-product may be recycled by introducing the magnesium oxide at the appropriate stage within existing magnesium smelting and refining operations.

In a second embodiment of the invention, the heat generated from the exothermic oxidation reaction (1) described above is used to drive an endothermic dehydrogenation reaction for generating more hydrogen. In this embodiment, a stable hydrogen containing compound such as a metal hydride is dehydrogenated through the use of heat produced from the oxidation reaction (1) described above:

$$XH_2 \rightarrow X + H_2 \text{(endothermic)} \qquad (2)$$

Exemplary reactions include the use of magnesium hydride or magnesium borohydride:

$$MgH_2 \rightarrow Mg + H_2 \text{(endothermic)} \qquad (2')$$

$$Mg(BH_4)_2 \rightarrow MgB_2 + H_2 \text{(endothermic)} \qquad (2'')$$

In the case of a simple metal hydride such as magnesium hydride, it is anticipated that the dehydrogenated compound can be rehydrogenated in situ. Alternatively, the dehydrogenated compound can be rehydrogenated at a recycling plant for subsequent use in the system. Given that this thermal decomposition dehydrogenation reaction (2) is driven by the heat created from the oxidation reaction (1), the amount of hydrogen generated can be controlled on demand by controlling the amount of water or steam injected into the reaction chamber to drive the oxidation reaction.

In a preferred embodiment, the metal compound used as a starting material in the exothermic oxidation reaction is the same as the hydrogen-containing compound used as a starting material in the endothermic dehydrogenation reaction. For example, magnesium hydride may be utilized as the starting material for both reactions as follows:

$$MgH_2 + H2O\text{(steam)} \rightarrow MgO + 2H_2 \text{(exothermic)} \qquad 1'''$$

$$MgH_2 \rightarrow Mg + H_2 \text{(endothermic)} \qquad 2'$$

Depending upon the reactor design, it is also anticipated that an amount of magnesium resulting from the thermal decomposition reaction (2) may also react with the steam to produce additional hydrogen and magnesium oxide:

$$Mg + H2O\text{(steam)} \rightarrow MgO + H_2 \text{(exothermic)} \qquad 1'$$

Alternatively, the oxidation and dehydrogenation reactions are performed in separate reaction chambers such that the amount of oxidized byproduct (e.g. MgO) is limited and the dehydrogenated compound (e.g. Mg) can simply be rehydrogenated for subsequent use in the system. The amount of energy needed to rehydrogenate the magnesium is significantly less than the amount of energy required to recycle the magnesium oxide such that this embodiment is preferred.

Also, in a preferred embodiment wherein the hydrogen generation system is used in conjunction with a hydrogen fuel cell or ICE, water generated in the fuel cell or ICE is collected and used in the form of steam in the oxidation reaction, thereby reducing the amount of water needed to be added to the system.

By using the oxidation reaction to drive the endothermic reaction, a relatively small amount of initial energy supplied by battery or otherwise is needed to initiate the reaction. Once the oxidation reaction is initiated, the heat generated from the reaction is self-sustaining such that it may be utilized to drive the endothermic dehydrogenation reaction. The byproduct of the dehydrogenation reaction may be rehydrogenated in situ or at an appropriate facility at relatively low cost. In addition, given that the oxidation reaction can be limited to generate only that amount of heat needed to drive the dehydrogenation reaction, the amount of oxidized by-product (e.g., MgO) can likewise be limited. The majority of the heat generated from the oxidation reaction is absorbed via the dehydrogenation reaction, and any remaining excess heat can be utilized for other applications or vented via radiators.

The invention also relates to a system for storing and generating hydrogen for use as a fuel. This system comprises a water storage vessel, a boiler, a reaction chamber charged with a metal or metal compound, a cooler, a hydrogen fuel based power system such as a hydrogen fuel cell or a modified hydrogen internal combustion engine (ICE), a system controller and conduit or lines to enable the various components to be in fluid flow connection. In this system, hydrogen gas is produced within the reaction chamber upon demand and directed to the power system. When hydrogen gas is needed, the system controller will cause the reaction chamber to be heated and water stored within the storage vessel to be pumped into the boiler and heated to form steam. The boiler and reaction chamber may be initially heated by electricity supplied by a battery. The generated steam is then injected into the reaction chamber wherein the metal or metal compound and steam react to form a metal oxide, hydrogen gas, and heat. The hydrogen gas will then be carried through a cooler to reduce the temperature of the gas. The cooled gas will then be introduced into the power system such as a fuel cell to generate electrical energy. In a preferred embodiment, excess water generated within the fuel cell may be filtered and pumped to the water storage vessel for subsequent use in the hydrogen generation process.

The metal oxide produced within the reaction chamber will be collected within the chamber or conveyed to a separate storage vessel for subsequent removal. The heat generated from the oxidation reaction may be transported through a radiator to expel the heat, and the heat is preferably first passed through a thermal electric device to create electrical energy for storage in the battery. A portion of the heat may also be used to heat the boiler for generation of additional steam.

In a most preferred embodiment, a substantial portion of the heat generated from the oxidation reaction is utilized to drive a dehydrogenation reaction. This dehydrogenation reaction can take place within the reaction chamber in which the oxidation chamber is carried out or a secondary reaction chamber. A hydrogen-containing compound, such as a metal hydride, is supplied to this reaction chamber and the heat from the oxidation reaction is utilized to dehydrogenate the compound. The hydrogen gas resulting from this dehydrogenation reaction is carried through the cooler to the fuel cell as described above. The dehydrogenated compound will be stored within the reaction chamber or transported to a separate vessel for subsequent removal or in situ re-hydrogenation.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF THE ILLUSTRATIVE EMBODIMENTS

Figure 1:
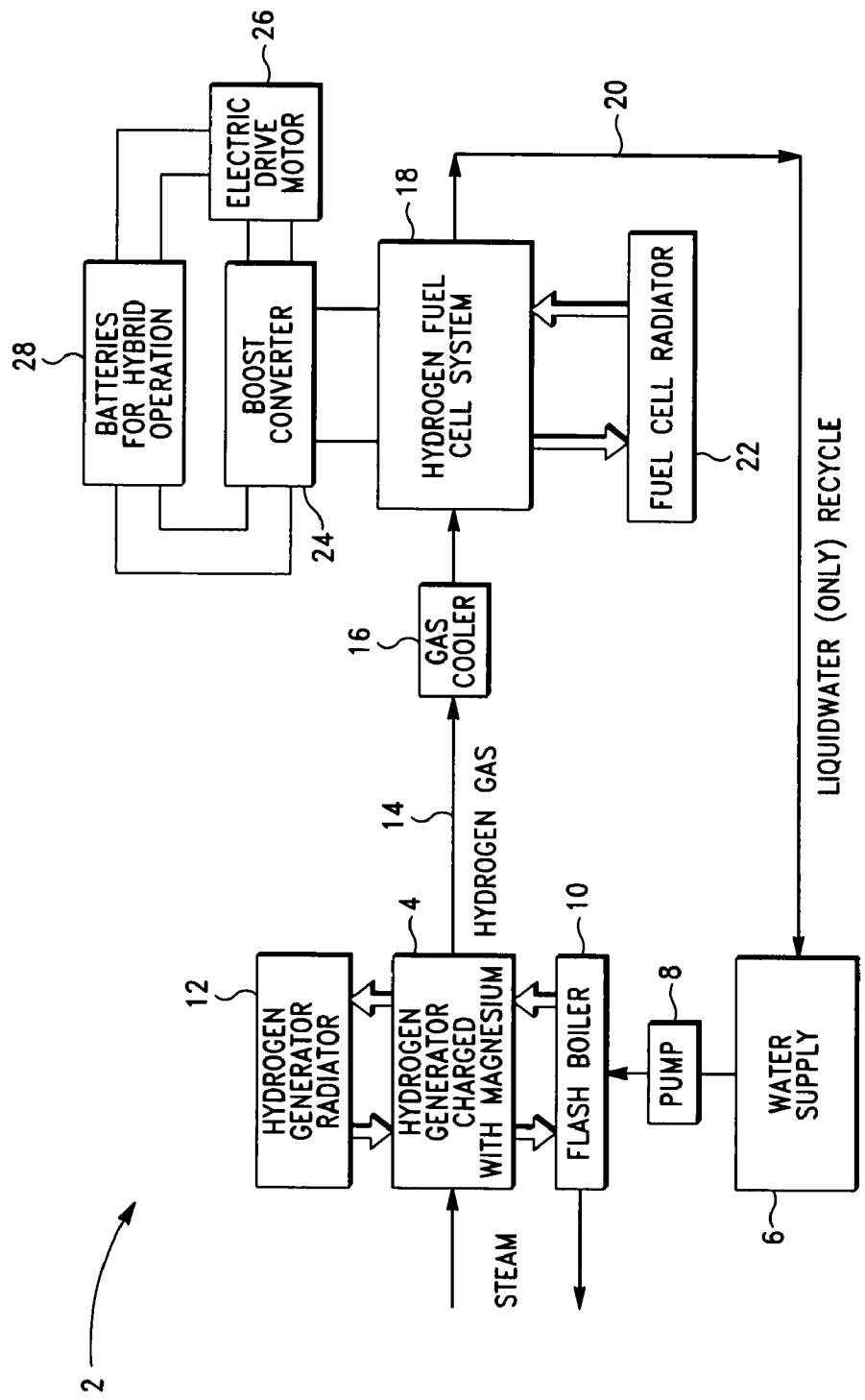
FIG. 1 is a schematic illustration of a system for generating power onboard a vehicle utilizing hydrogen in accordance with an embodiment of the present invention.

The present invention is directed to a method and system for storing a hydrogen source in a relatively stable and safe form, and for generating hydrogen gas therefrom upon demand for use as a fuel. The method and system are particularly well adapted as a primary or supplemental fuel source onboard vehicles for use in conjunction with a hydrogen fuel cell, an ICE hydrogen engine or other onboard hydrogen fueled power system, albeit the method and system could be utilized for other applications such as for use in primary, supplemental or emergency power systems for residential and industrial applications and for use in stand-alone power appliances or equipment. The method and system may be adapted for use onboard any motor vehicles including automobiles, trucks, buses, motor homes, airplanes, locomotives and marine vessels, and is particularly well adapted for use in automobiles, trucks, buses and motor homes.

Exothermic Reaction

In a first embodiment, hydrogen is generated by reacting a metal component with water in the presence of sufficient heat to oxidize the metal component:

$$M+H_2O \rightarrow MO+H_2 (exothermic) \quad (1)$$

wherein M comprises a metal component. For purposes of this invention, "metal component" shall mean a metal, metal compound or metal complex. The metal component may comprise alkali metals, alkaline-earth metals, zinc, aluminum, and boron, with magnesium being preferred. The metal component may comprise metal hydride compounds including, without limitation, alkali metal hydrides, alkaline-earth metal hydrides, zinc hydride, aluminum hydride, and borohydrides, with magnesium hydride being preferred. The metal hydride may be a complex metal hydride such as the metal borohydrides. Suitable metal borohydrides include, without limitation, barium borohydrides ($Be(BH_4)_2$), lithium borohydride ($LiBH_4$), aluminum borohydride ($Al(BH_4)_3$), titanium borohydride ($Ti(BH_4)_4$), magnesium borohydride ($Mg(BH_4)_2$), sodium valate borohydride ($NaV(BH_4)_4$), calcium borohydride ($Ca(BH_4)_2$), and sodium borohydride ($NaBH_4$), with magnesium borohydride being preferred.

Exemplary oxidation reactions in accordance with this invention include the use of a magnesium component in the form of magnesium, magnesium hydride or magnesium borohydride combined with superheated steam:

$$Mg+H_2O(steam) \rightarrow MgO+H_2(exothermic) \quad (1')$$

$$MgH_2+H_2O(steam) \rightarrow MgO+2H_2(exothermic) \quad (1'')$$

$$Mg(BH_4)_2+4H_2O(steam) \rightarrow Mg(BO_2)_2+4H_2(exothermic) \quad (1''')$$

It should be understood that other hydrogen liberating oxidation reactions would also be suitable for purposes of this invention. For example, it is contemplated that a metal, such as magnesium, may be reacted with ammonia to liberate the hydrogen contained within the ammonia and generate heat.

The oxidation reaction should take place within an enclosed reaction chamber at a temperature sufficient to initiate the oxidation reaction. Once the reaction has been initiated, any heat needed for the reaction and for heating the water to form steam can be supplied by the heat generated from the exothermic oxidation reaction. It is preferable that the reaction vessel and/or starting materials be initially heated to a temperature sufficient to fully oxidize the metal and yield the maximum amount of hydrogen. For example, it is anticipated that a certain amount of metal hydroxide, as opposed to metal oxide, will be formed at temperatures below about 300° C. Thus, it is preferable to initiate the reaction at temperatures above about 300° C., preferably ranging from about 300° to 1100° C., in order to fully oxidize the metal. Catalyst as are known in the art may optionally be included within the reaction chamber to assist in efficient oxidation.

A metal hydride such as magnesium hydride is particularly well suited for purposes of performing the oxidation reaction, as opposed to a metal, because the hydride readily oxidizes at relatively lower temperatures and without the need for catalyst, thereby requiring relatively little energy to initiate the reaction and saving expense. In addition, the hydride serves as a secondary hydrogen source in addition to water such that more hydrogen is liberated during the oxidation reaction. In a preferred embodiment, utilizing magnesium hydride, the reaction components are heated to a temperature of at least about 300° C., and the operating temperature of the reactor is thereafter maintained at a temperature ranging from about 300° to 600° C. via the heat generated form the exothermic reaction. The reaction occurs in the solid state and the byproduct magnesium oxide is produced in a powder form that is relatively easy to remove and transport for recycling.

Of course, it should be understood that the oxidation reaction may be initiated at higher temperatures and that the metal component may be provided in liquid or vaporized form. For example, where magnesium is being used as the feedstock, the magnesium may be heated to a temperature of at least 600° C., preferably ranging from 700° to 900° C., to form molten magnesium for the oxidation reaction. Alternatively, the magnesium may be heated to higher temperatures from 900° to 1100° C. and/or pressure applied to vaporize the magnesium.

The amount of water reacted with the metal component is proportional to the amount of hydrogen generated, such that the amount of hydrogen generated can be controlled via the amount of steam injected into the reaction chamber at any given time. In this manner, the hydrogen gas can be produced on demand dependent upon the fuel needs of the system. The hydrogen gas may then be removed from the reaction chamber as needed and supplied to the fuel cell, ICE or other power system. The oxidized by-product (e.g. magnesium oxide) can be collected and removed from the reaction chamber at which time the chamber can be "recharged" with fresh starting materials. The metal oxide may be recycled using various means known in the art or otherwise disposed of.

In a preferred embodiment using magnesium or magnesium hydride as the metal component, the by-product magnesium oxide recovered from the hydrogen generation system of the present invention may be recycled by introducing the magnesium oxide as a feedstock at the appropriate stage within existing magnesium smelting and refinery operations to produce refined magnesium. In this manner, the magnesium oxide by-product is recycled at existing facilities and its use as a feedstock conserves energy and expense within the magnesium smelting/refinery operations. For example, in commercial smelting and refinery operations using a seawater refinery process, the magnesium oxide may be supplied at the electrolysis or neutralizer stage of the process, thereby skipping a number of steps in the refining process. In commercial refineries using the Pidgeon process to recover magnesium from dolomite ore, the magnesium oxide can be supplied at the dolime stage. The resulting magnesium can then be rehydrogenated to form magnesium hydride starting material for hydrogen generation or can be used in other commercial applications.

The oxidation reaction is an exothermic reaction generating substantial excess heat. As described earlier, a portion of this heat may be used to generate additional steam and to maintain the reaction chamber at a desired temperature for efficient oxidation. In a preferred embodiment, the excess heat produced from this oxidation reaction is also used to drive an endothermic dehydrogenation reaction (2) described more fully below, resulting in increased hydrogen generation and consumption of the heat. Alternatively, the excess heat may be converted to other forms of energy such as by passing the heat through a thermal electric device to recover electrical energy for storage in a battery, or, may be disposed of via a radiator or other means known in the art.

Endothermic Reaction

In a second embodiment of the invention, the heat generated from the exothermic oxidation reaction (1) described above is used to drive an endothermic dehydrogenation reaction for generating more hydrogen. In this embodiment, a stable hydrogen containing compound is thermally decomposed by applying the heat produced from the oxidation reaction (1) described above in sufficient amount to dehydrogenate the compound. This reaction can comprise dehydrogenation of any hydrogen-containing compound, provided that the reaction is endothermic in nature and yields hydrogen gas. The hydrogen-containing compound may, for example, comprise a hydride or an ammonia compound.

In a preferred embodiment, the reaction comprises the thermal decomposition of a metal hydride:

$$XH_2 \rightarrow X + H_2 (\text{endothermic}) \qquad (2)$$

wherein X comprises a metal or metal complex. The hydrogen-containing compound preferably comprises a metal hydride including, without limitation, alkali metal hydrides, alkaline-earth metal hydrides, zinc hydride, aluminum hydride, and borohydrides, with magnesium hydride being preferred. The metal hydride may comprise a complex metal hydride such as metal borohydrides. It is anticipated that complex hydrides such as the metal borohydrides may be particularly well suited for purposes of this invention because the hydrogen capacity of these compounds is relatively high, but the energy required for thermal decomposition or dehydrogenation is relatively low. Suitable metal borohydrides include, without limitation, barium borohydrides ($Be(BH_4)_2$), lithium borohydride ($LiBH_4$), aluminum borohydride ($Al(BH_4)_3$), titanium borohydride ($Ti(BH_4)_4$), magnesium borohydride ($Mg(BH_4)_2$), sodium valate borohydride ($NaV(BH_4)_4$), calcium borohydride ($Ca(BH_4)_2$), and sodium borohydride ($NaBH_4$). The theoretical hydrogen capacity of each of these borohydrides by weight percent is listed below in Table 1.

| Material | Theoretical $H_2$ capacity (wt %) |
|---|---|
| $Be(BH_4)_2$ | 20.7 |
| $LiBH_4$ | 18.4 |
| $Al(BH_4)_3$ | 16.8 |
| $Ti(BH_4)_4$ | 14.9 |
| $Mg(BH_4)_2$ | 14.8 |
| $NaV(BH_4)_4$ | 12.0 |
| $Ca(BH_4)_2$ | 11.5 |
| $NaBH_4$ | 10.6 |

Exemplary dehydrogenation reactions in accordance with the present invention include the use of magnesium hydride or magnesium borohydride:

$$MgH_2 \rightarrow Mg + H_2 (\text{endothermic}) \qquad (2')$$

$$Mg(BH_4)_2 \rightarrow MgB_2 + H_2 (\text{endothermic}) \qquad (2'')$$

The dehydrogenated compound may be rehydrogenated in situ or at a recycling plant for subsequent use in the system. It is anticipated that a simple metal hydride such as magnesium hydride is particularly well suited to be rehydrogenated in situ by combining hydrogen gas with the dehydrogenated compound in the presence of heat and pressure. Thus, it is anticipated that hydrogen gas may simply be pumped into a chamber containing the dehydrogenated compound wherein appropriate pressure and heat are applied. In this manner, the system could be conveniently re-fueled at designated pumping stations much like conventional gasoline stations.

Alternatively, the dehydrogenated compound may be further oxidized by reaction with water as in reaction (1) above to generate more hydrogen and more heat for the dehydrogenation reaction. In this alternative scheme, the oxidized compound (e.g., magnesium oxide) will be collected and recycled at an appropriate facility as previously described.

Given that the thermal decomposition dehydrogenation reaction (2) is driven by the heat created from the oxidation reaction (1), the amount of hydrogen generated can be controlled on demand by controlling the amount of steam injected into the reaction chamber to drive the oxidation reaction an/or by the amount of heat generated by the oxidation reaction that is supplied for use in thermal decomposition. The amount of heat needed to drive the endothermic thermal decomposition reaction will vary depending upon the starting materials. For magnesium hydride, it is anticipated that a minimum temperature of 360° C., preferably varying from 400° to 600° C., will be necessary to result in efficient dehydrogenation.

In a preferred embodiment, the metal compound used as a starting material in the exothermic oxidation reaction (1) is the same as the hydrogen containing compound used as a starting material in the endothermic dehydrogenation reaction (2). For example, magnesium hydride may be utilized as the starting material for both reactions as follows:

$$MgH_2 + H_2O(\text{steam}) \rightarrow MgO + 2H_2 (\text{exothermic}) \qquad (1'')$$

$$MgH_2 \rightarrow Mg + H_2 (\text{endothermic}) \qquad (2')$$

It is noteworthy with this dual reaction that the exothermic oxidation reaction occurs efficiently beginning at a temperature around 300° C., and that the endothermic dehydrogenation reaction does not occur efficiently until reaching about 360° C. Thus, in addition to using the amount of water used to control the reactions, it is anticipated that the system may provide for performing only the exothermic oxidation reaction in some circumstances by maintaining the operational temperature below about 360° C. and by performing the dual reactions in parallel by maintaining the operational temperature above about 360° C. Furthermore, it is anticipated that higher rates of dehydrogenation will occur at higher temperatures.

Depending upon the reactor design, it is also anticipated that an amount of magnesium resulting from the thermal decomposition may also react with the steam to produce additional hydrogen and magnesium oxide:

$$Mg + H_2O(steam) \rightarrow MgO + H_2 (exothermic) \quad (1')$$

Alternatively, a magnesium borohydride may be utilized as the starting material for both reactions:

$$Mg(BH_4)_2 + 4H_2O(steam) \rightarrow M(BO_2)_2 + 4H_2 (exothermic) \quad (1''')$$

$$Mg(BH_4)_2 \rightarrow MgB_2 + H_2 (endothermic) \quad (2'')$$

For magnesium borohydride, it is believed that reaction (2") occurs in two steps at lower temperatures below about 300° C. wherein an intermediate of magnesium hydride is formed. At higher temperatures, reaction (2") occurs as shown in one step.

Combining the exothermic oxidation reaction to run in parallel with the endothermic dehydrogenation reaction is preferred because it yields a greater amount of hydrogen at less cost in terms of starting materials, energy input, and recycling cost. In the past, dehydrogenating magnesium hydride or other metal hydrides has not been considered economical because of the amount of heat required for the reaction. However, the energy required to dehydrogenate a metal hydride is significantly less than the heat generated from the oxidation reaction. By properly combining the reactions, hydrogen generation can occur via both reactions with essentially no heat output such that no heat exchanger or a relatively small heat exchanger is needed. For example, it is anticipated that for every mole of magnesium hydride oxidized, 2 moles of hydrogen will be released directly. In addition, through thermal decomposition, about 3 moles of additional hydrogen will be released (based on 100% utilization of the heat generated from the oxidation reaction). Furthermore, the cost of recycling is reduced because most of the hydrogen generated will be by dehydrogenating rather than through the formation of a metal oxide. The dehydrogenated compound can be rehydrogenated in situ or at an appropriate facility for less cost and repeated use. The dual reaction also takes place at a relatively low temperature such that the metal can remain in a solid state, which is much easier to deal with than a molten material.

System for Powering a Vehicle

A system for storing and generating hydrogen and for utilizing the same to power a motor vehicle in accordance with an embodiment of the present invention is denominated as reference numeral 2 in FIG. 1. Hydrogen gas is made in a hydrogen generator 4 having a reaction chamber charged with a metal component such as magnesium. Water stored within a water storage tank 6 is transferred via pump 8 and heated within flash boiler 10 to form superheated steam. The steam is then injected into reactor 4 at a flow rate proportional to the amount of hydrogen needed. The superheated steam reacts with the magnesium to yield magnesium oxide and hydrogen gas. This oxidation reaction is an exothermic reaction, generating a significant amount of heat. For instance, it is estimated that for every kilo of hydrogen produced, an average of about 44,500 watt-hours of heat are generated.

For start up purposes, electric heaters (not shown) or another source of heat is utilized for boiler 10 and may be powered in any manner known in the art, such as via battery.

After start-up, the boiler 10 is thereafter heated via high grade heat recovered from the hydrogen generator as a result of the exothermic oxidation reaction. It should be understood that flash boiler 10 may be a separate unit as shown in FIG. 1 or could be provided as an integral component of the generator itself. In that instance, heat transfer between the generator and boiler would be simplified. The heat needed to boil the water is significantly less than the total heat generated from the exothermic reaction. For example, it is estimated that approximately 6,000 watt-hours of heat are needed by the boiler to produce a kilo of hydrogen. This leaves about 38,000 watt-hours of high grade heat per kilo of hydrogen produced.

In a most preferred embodiment, a majority of the excess heat from the oxidation reaction is utilized to drive a second hydrogen generation reaction within reactor 4. This second reaction is endothermic in nature requiring at least a portion of the heat generated in the exothermic reaction in order to occur. In the preferred embodiment, the endothermic reaction comprises thermal decomposition of a hydrogen containing compound such as a metal hydride. The heat generated from the oxidation reaction is sufficient to dehydrogenate the metal hydride thereby yielding additional hydrogen and consuming a large portion of the waste heat from the oxidation reaction. Excess heat is expelled via hydrogen generator radiator 12. The system may also optionally include a thermo electric converter (not shown) between the radiator and the hydrogen generator to generate electrical power that may then be stored in batteries.

In the embodiment shown in FIG. 1, the two reactions may take place within the same generator 4, wherein the reactor is charged with the metal hydride or the metal hydride may be fed into generator 4 upon demand from a holding tank (not shown) operably connected to the generator. Alternatively, the oxidation and dehydrogenation reactions may take place in separate chambers within the generator or in two separate generators wherein the heat from the oxidation reaction may be transferred to the secondary generator via heat exchangers to drive the dehydrogenation reaction in a controlled manner.

The hydrogen gas generated within generator 4 is transferred along line 14 to a gas cooler 16 to reduce the temperature of the gas before entering hydrogen fuel cell system 18. It should be understood that any power system that uses hydrogen as a starting material or fuel now known in the art or later developed is considered suitable for purposes of this invention. Thus, while it is anticipated that the hydrogen generation system may be used with a hydrogen fuel cell as is known in the art, it is also anticipated that the hydrogen may instead be used with a modified hydrogen internal combustion engine (ICE) or other power system using hydrogen as a fuel. In the case of an ICE hydrogen engine, it is anticipated that the hydrogen gas may need to be run through a condenser before entry into the engine to remove unwanted water vapor.

During operation of the hydrogen fuel cell system 18, water will be generated in the form of liquid and vapor. In the embodiment shown, liquid water generated in the fuel cell is transferred via line 20 to water tank 6 for subsequent use in the hydrogen generation process. Water vapor generated in the fuel cell could also optionally be run through a condenser (not shown) and transferred for storage in water tank 6 for subsequent use in the hydrogen generation process. In this manner, water generated in the fuel cell is recycled and a reduced amount of water is required to be supplied and stored in order to operate the system. It is anticipated that a certain amount of water may also be produced through use of an ICE hydrogen engine that is typically vented from the system as exhaust. This water vapor could similarly be condensed, filtered, and utilized in the hydrogen generation system.

The fuel cell will also generate a certain amount of low grade heat. This heat may be disposed by a radiator 22. Alternatively, the heat could be utilized to heat boiler 10 or, alternatively, in certain vehicular applications it could also be used for the vehicle in conjunction with the vehicle heater.

Once power is generated within fuel cell system 18, it is conditioned by a boost converter 24 as is known in the art. This boost converter raises the fuel cell voltage to the vehicle operating voltage. The power is then used to power the electric drive motor 26 directly, as well as to charge high rate batteries 28 used for handling load peaks.

The metal oxide by-product of the oxidation reaction is collected within the generator or a separate tank and subsequently removed for recycling or disposal. The dehydrogenated compound will also be collected within the generator or a separate tank for subsequent removal or in situ re-hydrogenation.

It should be understood that operation of the system will be controlled by various computerized control mechanisms as is known in the art for initiating operation of the various components, including, without limitation, triggering start-up, controlling the flow and amount of materials based on fuel needs, and monitoring and controlling temperature.

Exemplary Hydrogen Generators

Figure 2:
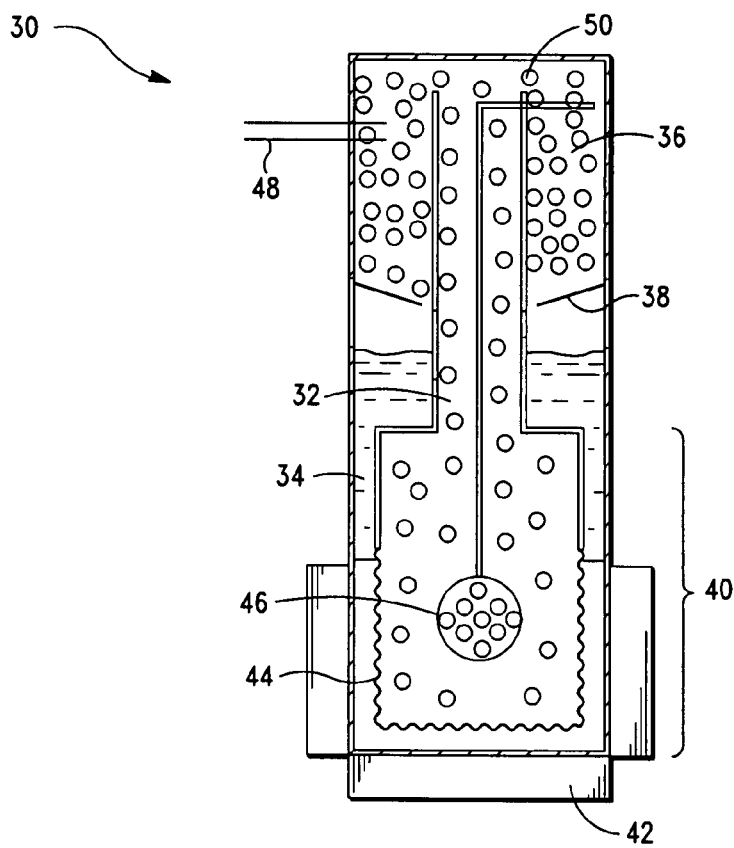
FIG. 2 is a schematic sectional view of a reactor for generating hydrogen in accordance with an embodiment of the invention, wherein the metal component is in molten form.

FIG. 2 illustrates a hydrogen generator or reactor for generating hydrogen in accordance with one embodiment of the invention utilizing a magnesium and steam oxidation reaction, wherein the magnesium is heated to molten form. Generator 30 includes an inner chamber 32 and an outer chamber 34. Magnesium pellets are fed into an upper storage section 36 of the outer chamber and retained within upper storage section 36 via flapper valve 38. An insulating section (not shown) is positioned below flapper valve 38 to insulate the magnesium raw material from the heat surrounding reaction area 40, such that the magnesium pellets are maintained in a solid state within upper storage section 36. The magnesium pellets are released as needed into the lower portion of outer chamber 34 within reaction area 40 via flapper valve 38.

A heat source such as heating elements 42 surrounds the exterior of outer chamber 34 along the bottom and lower sidewalls of the generator. Elements 42 heat the magnesium to a minimum of about 650° C., preferably 700° to 900° C., such that the magnesium is molten in nature. A metal screen 44 separates the molten magnesium from inner chamber 32 within reaction area 40 and the magnesium liquid does not pass through screen 44 due to surface tension. Steam is injected uniformly throughout inner chamber 32 within the reaction area 40 via injector 46. The steam interacts with the molten magnesium at the screen interface thereby producing hydrogen gas and magnesium oxide. The hydrogen and magnesium oxide produced via this oxidation reaction will reside within inner chamber 32. The hydrogen gas may be removed through an off gas line 48. The magnesium oxide is relatively lightweight in nature and will be inclined to move upward into the upper regions of inner chamber 32 for subsequent removal. In the embodiment shown in FIG. 4, an opening 50 is presented between inner and outer chambers 32 and 34 respectively of the generator at the top of the generator. The magnesium oxide may move through this opening to gradually backfill upper storage section 36 as magnesium is released from the storage section into the reaction area for use. In this manner, the volume of upper storage section 36 is fully utilized and the magnesium oxide can be removed from the storage section upon refueling. Given that the reaction is occurring adjacent an external wall of the reactor, heat generated from the reaction can be removed via a heat release line (not shown) in the external wall.

Figure 3:
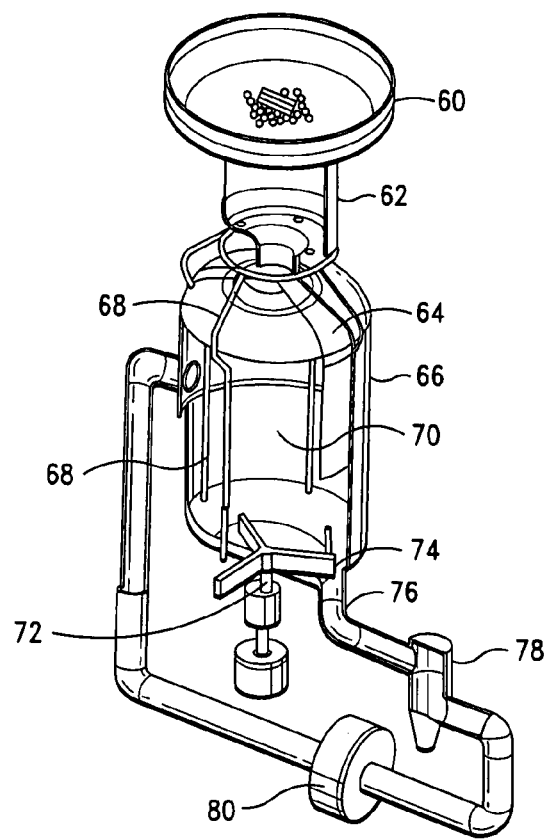
FIG. 3 is a schematic sectional view of an alternative reactor for generating hydrogen in accordance with an embodiment of the invention, wherein the metal component is in molten form.

FIG. 3 illustrates an alternative generator or reactor 58 for performing the oxidation reaction with a molten metal such as magnesium. In this embodiment, magnesium pellets are fed from an upper reservoir 60 through the center of an insulating tube 62 to a flow spreader 64 wherein the surface of the flow spreader is heated serving to melt the magnesium and spread the molten magnesium to flow circumferentially downward along the inner surface of the external peripheral wall 66 of the reactor. The liquid magnesium is allowed to drip down along the inner surface of the wall 66 coating the wall with a relatively thin layer of molten magnesium. Surface tension holds the magnesium to the inner surface of the wall. Water is introduced through a manifold connected to multiple steam ejectors 68 running vertically through the reactor to release steam throughout the internal reactor chamber 70. The generator is heated via heating elements (not shown) and the water is converted to steam in the generator itself due to the high temperature of the generator. The magnesium interacts with the steam to form hydrogen gas and magnesium oxide. The hydrogen and magnesium oxide formed during the reaction is carried to the bottom of the reactor where an impeller 72 pushes the hydrogen and magnesium oxide through an opening 74 in the bottom. The hydrogen gas and magnesium oxide flow through tube 76 to cyclone separator 78. Separator 78 removes the magnesium oxide particles from the hydrogen gas within the stream. The cleaned gas stream then passes through a blower 80 after which the gas is sent back to the reactor vessel and a tap (not shown) removes the hydrogen for use. Given that the reaction is occurring adjacent an external wall of the reactor, heat generated from the reaction can be removed via a heat release line (not shown) through the external wall.

Figure 4:
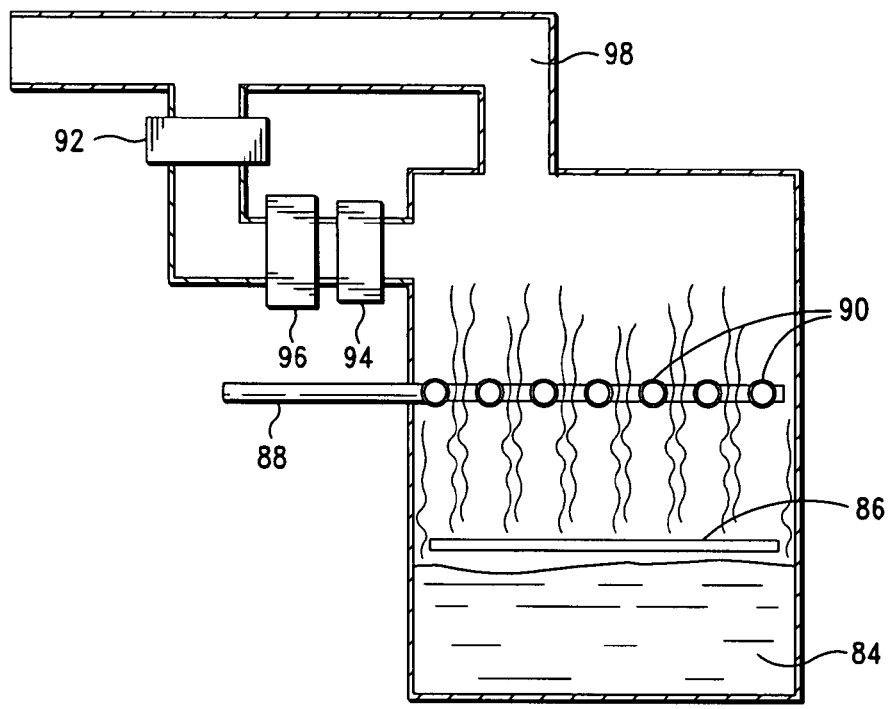
FIG. 4 is a schematic sectional view of a reactor for generating hydrogen in accordance with an embodiment of the invention, wherein the metal component is in a vapor phase.

FIG. 4 illustrates a hydrogen generator or reactor 82 for generating hydrogen by reacting steam with vaporized magnesium. In this embodiment, molten magnesium 84 is heated to a temperature ranging from about 900° to 1100° C. and retained within a bottom portion of the reactor. Vaporized magnesium transfers around a vapor restricting plate 86 into a mid-portion of the reactor. Steam is injected into the mid-portion of the reactor via an injector tube 88 having multiple outlets 90 for releasing the steam throughout the mid-portion of the reactor vessel for reaction with the vaporized magnesium. The vaporized magnesium and steam will react to form hydrogen gas and magnesium oxide. It is anticipated that the vapor phase reaction will suspend the by-product magnesium oxide in the gas phase such that it can be removed via suction (not shown). It should be noted that plate 86 serves to prevent magnesium oxide from forming on top of the molten magnesium. By covering most of the molten magnesium surface, the magnesium vapor moves upward along the side edges of the plate into the mid-portion of the reactor for contact with the steam. The magnesium oxide is therefore formed in the vapor phase as opposed to on the surface of the liquid metal and is thereby separated from the magnesium for easier removal.

In this embodiment, excess heat generated from the reaction is extracted by passing the hydrogen gas end product through one or more heat exchangers 92. Because the hydrogen flow rate may not be sufficient to extract all of the heat through one cycle, the embodiment shown in FIG. 6 envisions recycling the hydrogen to run through heat exchanger 92 more than once. In this embodiment, a blower 94 pulls hydrogen from the reaction chamber through a cyclone separator 96 and one or more heat exchangers 92. The hydrogen gas is recycled back along line 98 into the reaction chamber for subsequent removal by the blower.

Figure 5:
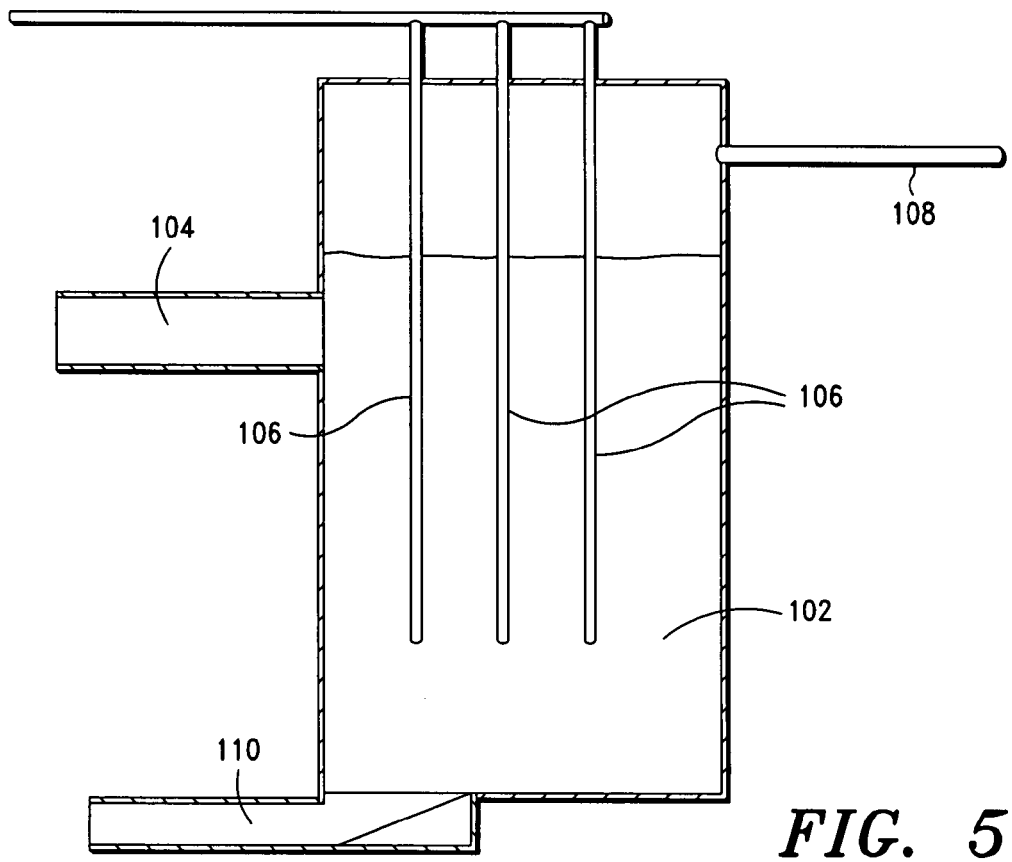
FIG. 5 is a schematic sectional view of a reactor for generating hydrogen in accordance with an embodiment of the invention, wherein the exothermic and endothermic reactions are performed in a single reaction chamber.

FIG. 5 illustrates a generator or reactor 100 for use in conjunction with a preferred embodiment of the invention wherein the exothermic oxidation reaction runs in parallel with an endothermic dehydrogenation reaction. In the embodiment shown in FIG. 5, magnesium hydride 102 is supplied in solid form through a fill conduit 104 into the reaction chamber of the generator. Steam injectors 106 are buried within the solid magnesium hydride. The steam is injected at a temperature ranging from 330° to 400° C. In this preferred embodiment, no additional heat is required by the reactor. The superheated steam and magnesium hydride will react within the reaction chamber to form hydrogen gas, magnesium oxide, and excess heat. The excess heat will diffuse through the magnesium hydride and cause dehydrogenation of the magnesium hydride. The dehydrogenation reaction is endothermic in nature such that it will absorb the excess heat, generating hydrogen gas and magnesium. Some of this magnesium may also react with the steam to produce additional hydrogen gas and magnesium oxide. The hydrogen may be removed through line 108. By-products remaining in the reactor will be magnesium oxide and magnesium, which can be removed via outlet 110 for separation and recycling once the magnesium hydride is spent within the reactor.

In this embodiment, the reactor serves as the storage tank for magnesium hydride thereby saving volume and weight and making the system more compact. It is anticipated that multiple reactors of this type may be employed onboard a vehicle since the magnesium hydride within the reactor/storage tank will need to be completely spent before emptying and refilling the tank to avoid wasting active material. It is alternatively anticipated that the reactor may include two separate reaction chambers—one for the exothermic oxidation reaction and another for the endothermic dehydrogenation reaction. The heat generated from the exothermic reaction may be transferred via heat exchanger tubes to the reaction chamber for the endothermic dehydrogenation reaction. In this manner, the by-products from the two reactions will be separated.

Example 1

Hydrogen Flow Vrs. Water Injection Rate

Two boats containing 30 grams each of magnesium hydride powder were placed within a tube furnace. The boats were heated to a temperature of about 370° C. and the furnace was then turned off. Looking to FIGS. 6 and 7, water was supplied through the tube and injected as steam onto the magnesium hydride at a flow rate of 1 cc/min at points labeled "ON" and the water was turned off at points labeled "OFF". The furnace was again turned on at the point labeled "HEAT" to rise the temperature to about 510° C. to dehydrogenate any remaining magnesium hydroxide.

Figure 6:
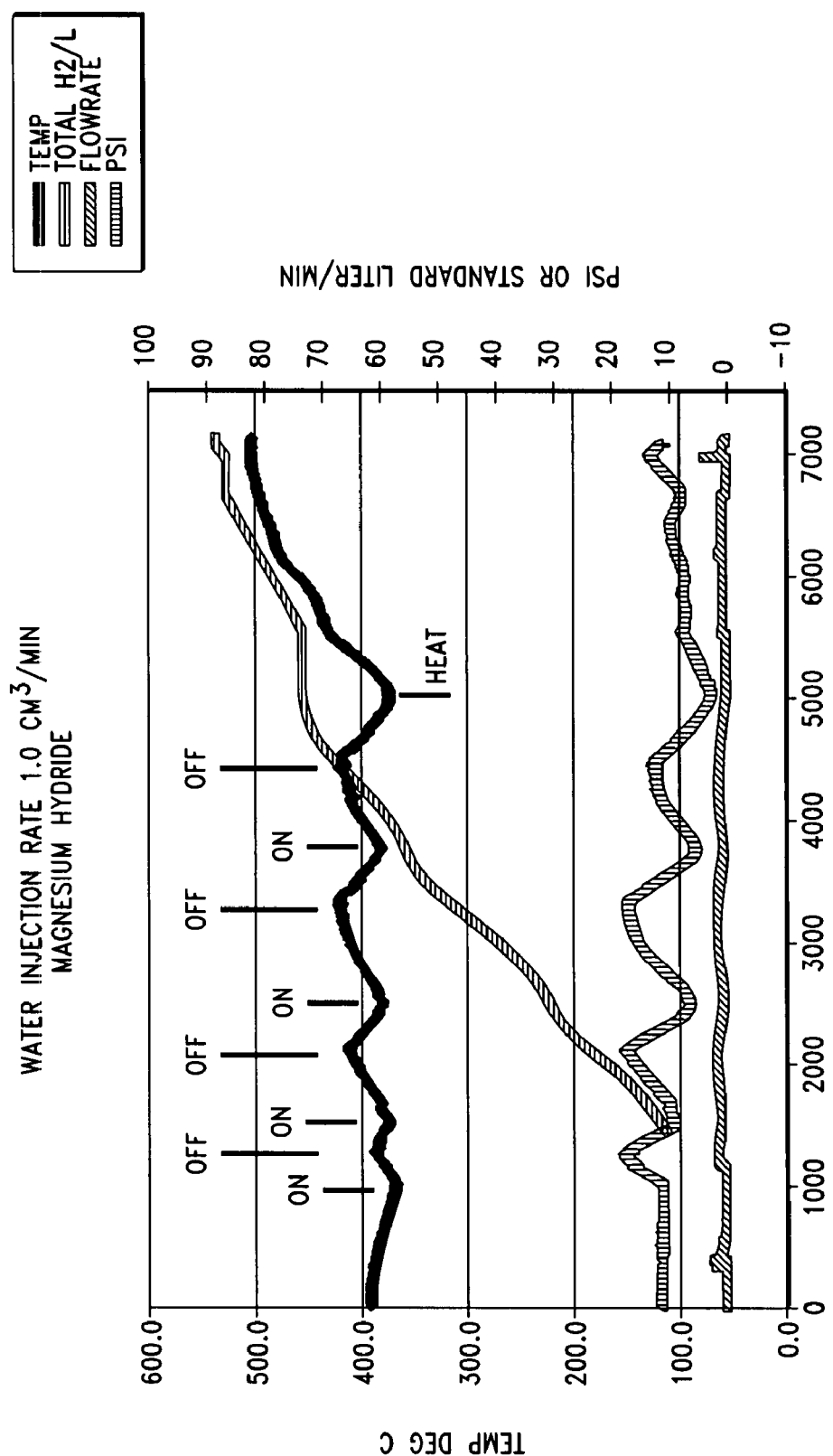
FIG. 6 depicts the temperature, pressure, hydrogen flow rate and total hydrogen gas produced in Example 1.
Figure 7:
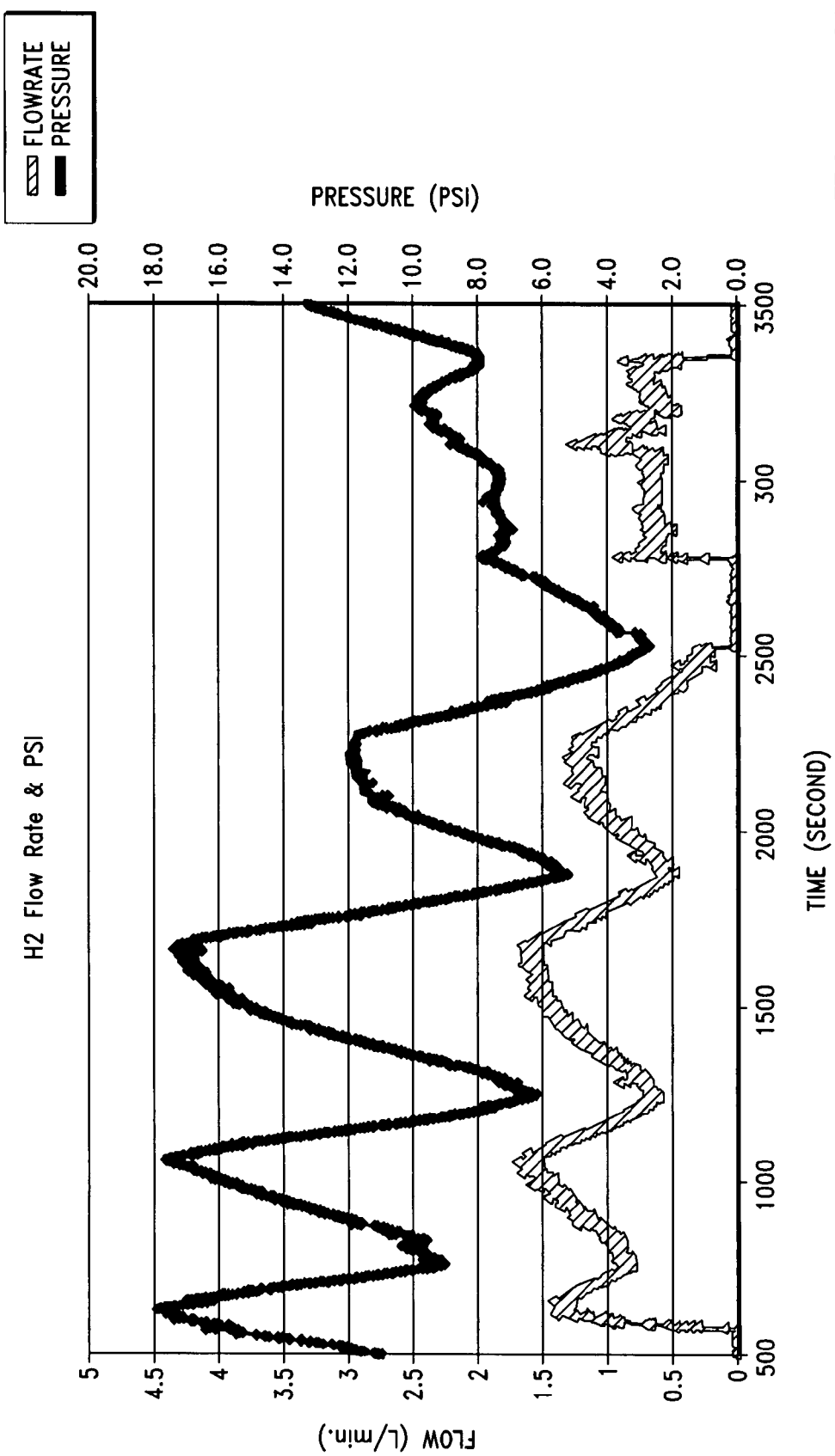
FIG. 7 depicts the hydrogen flow rate for Example 1.

Measurements of the temperature within the tube, the pressure and flow rate of hydrogen gas within the tube and the total hydrogen production are depicted in FIG. 6. Measurements on a larger scale of the pressure and flow rate are also depicted in FIG. 7. It is noteworthy that the temperature increased as water was injected into the system denoting the exothermic nature of the oxidation reaction. The decrease in temperature after shutting off the water evidences that a portion of the heat is being absorbed for the dehydrogenation reaction. It is believed that a portion of the heat is also being lost to the environment. Hydrogen production evidenced via the flow rate and pressure also increase with the addition of the water and resulting heat, decreasing when the water is turned off.

A total of 41 cc of water was injected into the system and a total of 88 liters of hydrogen was generated. It was calculated that about 38% of the hydrogen generated was attributed to the dehydrogenation reaction and about 62% of the hydrogen generated was attributed to the oxidation reaction.

From the foregoing, it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A method for generating hydrogen, said method comprising: oxidizing a metal component by reacting a metal component with water to form an oxidized metal, hydrogen, and heat; dehydrogenating a hydrogen containing compound by applying at least a portion of said heat to said hydrogen containing compound in sufficient amount to generate additional hydrogen, wherein the amount of hydrogen generated is proportional to the amount of water utilized in the oxidizing step.

2. A method in accordance with claim 1, wherein said oxidizing step comprises reacting a metal component with water wherein the metal component is selected from the group consisting of metals and metal hydrides.

3. A method in accordance with claim 2, wherein said metal component is selected from the group consisting of alkali metals, alkaline-earth metals, zinc, aluminum and boron.

4. A method in accordance with claim 3, wherein said metal component is magnesium.

5. A method in accordance with claim 2, wherein said metal component is selected from the group consisting of alkali metal hydrides, alkaline-earth metal hydrides, zinc hydride, aluminum hydride and borohydrides.

6. A method in accordance with claim 2, wherein said metal component is magnesium hydride.

7. A method in accordance with claim 2, wherein said metal component is a complex metal hydride.

8. A method in accordance with claim 7, wherein said metal component comprises metal borohydrides.

9. A method in accordance with claim 8, wherein said metal component is selected from the group consisting of beryllium borohydrides ($Be(BH_4)_2$), lithium borohydride ($LiBH_4$), aluminum borohydride ($Al(BH_4)_3$), titanium borohydride ($Ti(BH_4)4$), magnesium borohydride ($Mg(BH_4)2$), sodium valate borohydride ($NaV(BH_4)_4$), calcium borohydride ($Ca(BH_4)_2$), and sodium borohydride ($NaBH_4$).

10. A method in accordance with claim 1, 2, 4 or 6 wherein said oxidizing step comprises reacting a metal component with water wherein said water is provided in the form of steam.

11. A method in accordance with claim 1 or 2 wherein said dehydrogenating step comprises dehydrogenating a hydrogen containing compound, said hydrogen containing compound comprising a metal hydride.

12. A method in accordance with claim 11, wherein said metal hydride comprises magnesium hydride.

13. A method in accordance with claim 11, wherein said metal hydride is a complex metal hydride.

14. A method in accordance with claim 13, wherein said complex metal hydride comprises metal borohydrides.

15. A method in accordance with claim 14, wherein said metal borohydrides are selected from the group consisting of beryllium borohydrides ($Be(BH_4)_2$), lithium borohydride ($LiBH_4$), aluminum borohydride ($Al(BH_4)_3$), titanium borohydride ($Ti(BH_4)4$), magnesium borohydride ($Mg(BH_4)2$), sodium valate borohydride ($NaV(BH_4)_4$), calcium borohydride ($Ca(BH_4)_2$), and sodium borohydride ($NaBH_4$).

16. A method for generating hydrogen, said method comprising: reacting a magnesium component with steam to form an oxidized magnesium compound, hydrogen, and heat; dehydrogenating a magnesium hydride compound by applying at least a portion of said heat to said magnesium hydride component sufficient to generate additional hydrogen, wherein the amount of hydrogen generated is proportional to the amount of water utilized in the oxidizing step.

17. A method in accordance with claim 16, wherein said reacting step comprises reacting said magnesium component with steam, said magnesium component being selected from the group consisting of magnesium and magnesium hydride compounds.

18. A method in accordance with claim 16, wherein said reacting step comprises reacting a magnesium hydride compound with steam, said magnesium hydride compound selected from the group consisting of magnesium hydride and magnesium borohydride.

19. A method in accordance with claim 16, 17, or 18, wherein said dehydrogenating step comprises dehydrogenating a magnesium hydride compound selected from the group consisting of magnesium hydride and magnesium borohydride.

20. A method for storing and generating hydrogen onboard a vehicle, said method comprising: storing water and magnesium hydride onboard a vehicle; heating said water to generate steam; combining said steam with a portion of said magnesium hydride to generate hydrogen, magnesium oxide and heat; and applying at least a portion of said heat to a portion of said magnesium hydride to generate additional hydrogen gas and magnesium.

21. A method in accordance with claim 20, wherein said method additionally comprises controlling the amount of hydrogen generated by controlling the amount of steam combined with said portion of said magnesium hydride.

22. A method in accordance with claim 21, wherein said method additionally comprises delivering said hydrogen to a fuel cell onboard said vehicle.

23. A method in accordance with claim 22, wherein a portion of said water is generated in said fuel cell.

24. A method in accordance with claim 20, wherein said magnesium is rehydrogenated in situ onboard the vehicle.

* * * * *